Patented Sept. 15, 1942

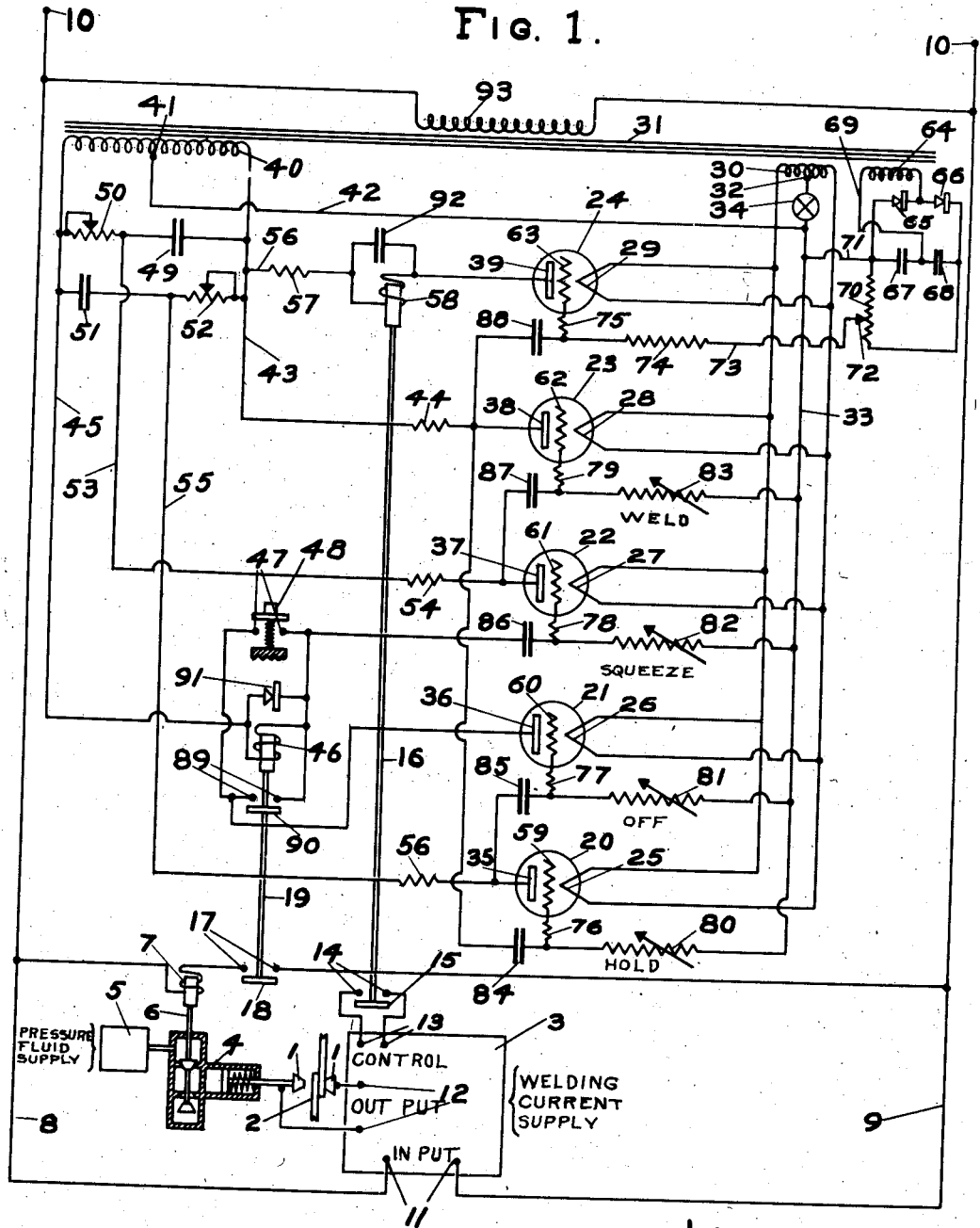

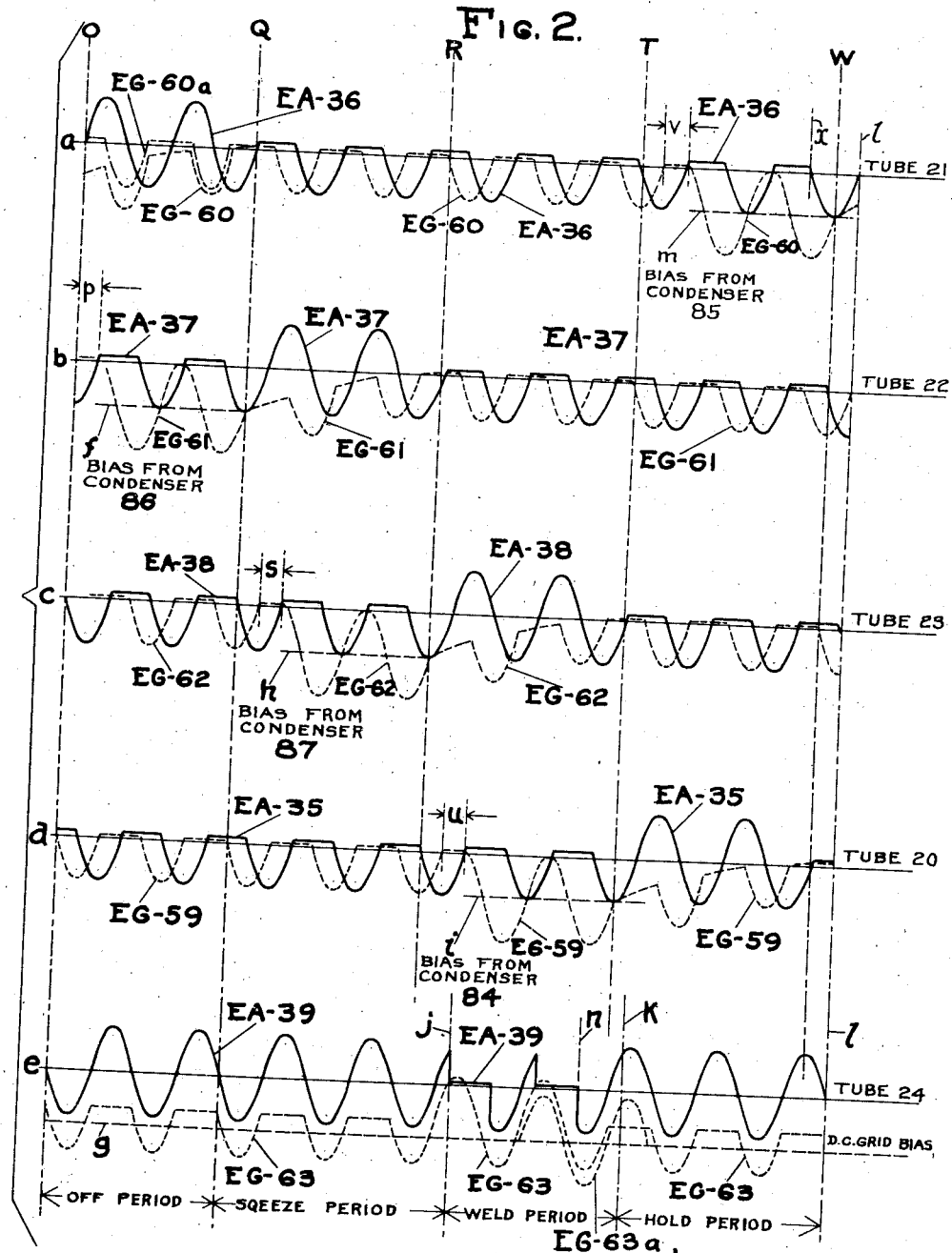

2,295,601

UNITED STATES PATENT OFFICE 2,295,601

ELECTRON TUBE TIMING DEVICE

Wilcox P. Overbeck, Waltham, Mass., assignor to Raytheon Manufacturing Company, Newton, Mass., a corporation of Delaware Application July 19, 1939, Serial No. 285,309

17 Claims. (Cl. 250—27)

This invention relates to an electron tube timing device, and more particularly to such a device which performs a cycle of timing operations and in which automatic repetition of such a cycle is afforded. This invention has particular application to resistance welding systems in which such a cycle of timed operations occurs.

An object of this invention is to accomplish such timing operations in a simple and reliable manner.

Another object is to provide for increased accuracy of operation.

A further object is to obtain individual adjustments of the length of each timed period without affecting the length of any other period.

A still further object is to provide means for preventing one of said timed periods from exceeding a predetermined maximum value.

The foregoing and other objects of my invention will be best understood from the following description of an exemplification thereof, reference being had to the accompanying drawings, wherein:

Fig. 1 is a diagrammatic representation of a system embodying my invention; and

Fig. 2 is a set of curves representing certain operating characteristics of the system shown in Fig. 1.

The system shown in Fig. 1 is represented as being applied to a resistance welding device containing a pair of welding electrodes 1—1 which are adapted to operate upon a resistance welding load 2, consisting of material to be welded. Welding current is supplied from a suitable welding current control device 3 which may be, for example, such a device as is described and claimed in my copending application for an improvement in Arc tube systems, Serial No. 271,679, filed May 4, 1939. The electrodes 1—1 are brought into contact with the resistance welding load 2 by means of a pressure gun 4. This pressure gun is operated from a suitable supply of pressure fluid 5. The supply of this pressure fluid to the gun 4 is controlled by a valve 6 operated by a solenoid 7. When the solenoid 7 operates the valve 6, the pressure fluid from 5 is supplied to the gun 4, and the electrodes 1 are moved so as to clamp the resistance welding load 2. When the valve 6 is released, the electrodes 1 are released from the resistance welding load 2.

The system illustrated is energized from two alternating current lines 8—9 which are connected at the terminals 10 to a suitable source of alternating current. The welding current control 3 is energized from the lines 8—9 at input terminals 11. The output current from the welding control 3 is taken from a pair of output terminals 12 and supplied to the two welding electrodes 1—1. The welding current control 3 is provided with a pair of current control terminals 13 extending to the control contacts 14 which are adapted to be closed by an armature 15. When the contacts 14 are closed, welding current is fed from the output terminals 12 to the welding electrodes 1—1. When said contacts 14, however, are opened, the supply of current to the welding electrode 1—1 is terminated.

The armature 15 forms part of a welding current control relay 16. The coil 7 of the valve 6 is energized from the alternating current lines 8 and 9, and is controlled by a pair of contacts 17 in series with said coil 7. The contacts 17 are adapted to be closed by an armature 18 of the electrode control relay 19. Thus when the relay 19 is operated, the welding electrodes 1—1 clamp the resistance welding load 2, and when the relay 16 is operated, current is supplied to said welding load.

In order to control the sequence of operations, the system is provided with control tubes 20 to 24, inclusive. Each of these tubes is of the gas or vapor-filled type in which the initiation of an ionizing discharge therein is controlled by a control electrode such as, for example, a grid interposed between the cathode and anode. In the system to be described, conduction between each cathode and anode may be initiated if the grid is at substantially the same potential as the cathode or slightly positive with respect thereto. These tubes are provided with cathodes 25 to 29, inclusive. The cathodes may be of the filamentary type which are supplied with heating current from a secondary winding 30 on the transformer 31. Each of the filamentary cathodes 25 to 29, inclusive, is connected across the outer ends of said secondary winding 30. Said secondary winding is also provided with a center tap extending to the common cathode lead 33. A control switch 34 is interposed in this lead so as to control the energization of the system. The tubes are also provided with anodes 35 to 39, inclusive. All of these anodes have impressed upon them alternating potentials from the secondary winding 40 also on the transformer 31. As will be described below, for most reliable operation of the system, the voltages on the anodes 35, 36, 37 and 38 are displaced 90 degrees from each other. The voltage on the anode 39, however, may be in phase with the voltage on the anode 38. In order to complete the external circuit to the cathodes, the secondary winding 40 is provided with a center tap 41 from which a conductor 42 extends to the common cathode lead 33.

In order to supply voltage to the anode 38, a conductor 43 extends from one end of the secondary winding through a current-limiting resistance 44 to the anode 38. Likewise a conductor 45 extends from the other end of said secondary winding 40 through the operating coil 46 of the relay 19, and a pair of contacts 47 to the anode 36. The contacts 47 may be closed by a control switch which may be a pushbutton 48. Thus the voltages supplied to the anodes 36 and 38 are displaced 180 degrees from each other. In order to secure voltages displaced 90 degrees from the foregoing voltages to supply anodes 35 and 37, two phase-shifting circuits are provided. One of these phase-shifting circuits consists of a condenser 49 connected in series with a resistance 50 across the secondary winding 40. The other of these phase-shifting circuits consists of a condenser 51 in series with a resistance 52 also connected across the secondary winding 40. A conductor 53 extends from a point between the condenser 49 and the resistance 50 through a current-limiting resistance 54 to the anode 37. Likewise a conductor 55 extends from a point between the condenser 51 and the resistance 52 through a current-limiting resistance 56 to the anode 35. Constants of the phase-shifting circuit are so chosen that the voltages on anodes 35 and 37 are substantially 180 degrees apart, and are displaced 90 degrees with respect to the voltage on the anodes 36 and 38. The value of 90-degree phase displacement is, however, merely the preferred angular relationship, and if other phase angles are desired, the resistances 50 and 52 may be made adjustable, as indicated, in order to vary this angular relationship. Since the voltage on anode 39 is to be in phase with the voltage on anode 38, a conductor 56 extends from the conductor 43 through a current-limiting resistance 57, and the operating coil 58 of the relay 16 to the anode 39.

In order to control the initiation of current conduction in each of the tubes 20—24, they are provided with control grids 59 to 63, inclusive. The control grid 63 of the tube 24 is supplied with a D. C. bias from a rectifying voltage-doubling circuit. This rectifying circuit is energized from a secondary winding 64 on the transformer 31. One end of this secondary winding is connected to a point between a pair of rectifiers 65 and 66 which are preferably of the copper-oxide type. Two terminals of opposite polarity of the rectifiers 65 and 66 are connected together, while the outer ends of opposite polarity are connected to the outer ends of two condensers 67 and 68 connected in series. A conductor 69 extends from a point between the condensers 67 and 68 to the opposite end of the secondary winding 64. Thus a D. C. voltage of substantially double the peak voltage of the alternating voltage appearing across the secondary 64 is produced across the outer ends of the condensers 67 and 68. In order to select the desired bias from this output voltage, a potentiometer 70 is connected across the outer ends of the condensers 67 and 68. A conductor 71 extends from one end of the potentiometer 70 to the common cathode lead 33. An adjustable tap 72 on the potentiometer 70 is connected to a conductor 73 which extends through resistances 74 and 75 to the grid 63. The resistance 75 is of sufficient value to prevent appreciable current from flowing to the grid 63 within the tube 24. The above system impresses a negative potential on the grid 63 with respect to the cathode 29. By adjusting the tap 72, the value of this negative voltage may be varied.

During a certain portion of the operation of this system, current flows to each of the grids 59 to 62, inclusive. In order to limit the value of this current, these grids are connected in series with resistances 76 to 79, inclusive. Adjustable resistances 80 to 83, inclusive, are connected from the outer ends of resistances 76 to 79, respectively, to the common cathode lead 33.

The control of conduction of each tube by its associated grid is dependent upon the state of conduction of one of the other tubes. For this purpose grid 59 is connected through its resistance 76, and the condenser 84 to the anode 38; grid 60 is connected through its resistance 77, and the condenser 85 to the anode 35; grid 61 is connected through its resistance 78, and the condenser 86 to the anode 36 through the pushbutton switch 48; grid 62 is connected through its resistance 79, and the condenser 87 to the anode 37; and grid 63 is connected through its resistance 75, and the condenser 88 also to the anode 38. Since the grids 63 and 59 are both connected to the anode 38 through the above circuits, the operation of both of these grids is dependent upon the state of conduction of the anode 38.

In order to permit a momentary closure of the pushbutton switch 48 to initiate a complete welding cycle, hold-in contacts 89 are connected across the pushbutton contacts 47. These hold-in contacts are adapted to be closed by an armature 90 mounted on the relay 19. For purposes to be described below, a rectifier 91, preferably of the copper-oxide type, is connected across the coil 46, and a condenser 92 is connected across the coil 58.

The transformer 31 is provided with a primary winding 93 energized from the alternating current lines 8—9.

The operation of the system described above may be explained by referring to the curves of Fig. 2. The axes $a$ to $e$, inclusive, represent the cathode voltages of the tubes 21, 22, 23, 20 and 24, respectively. On these respective axes, the solid curves EA represent the anode voltages, while the dotted curves EG represent the grid voltages of the respective tubes. The numerals associated with each of these legends correspond to the reference numerals on the respective anodes and grids. Fig. 2 represents one typical cycle of operations which may be repeated indefinitely, and upon such repetition the left-hand end of the curves may be considered as fitting onto the right-hand end thereof.

Let us assume that the terminals 10—10 are energized with alternating current, the switch 34 is closed, the cathodes 25 to 29, inclusive, are raised to their operating temperatures, and the pushbutton switch 48 is in its open position. Under these conditions the circuit to the anode 36 is open both at the contacts 47 and 89, and the tube 21 is therefore non-conducting. However, substantially the full voltage of the left half of secondary 40 is impressed between the cathode 27 and the grid 61 through the coil 46, condenser 86, and resistance 78. The resistance 78 is of such a value that on the first positive voltage cycle supplied to the grid 61, current flows between the cathode 27 and the gride 61 acting as an anode to charge the condenser 86 to the peak value of the alternating current voltage, as indicated by the line f below the axis b. This occurs during substantially one-quarter of the alternating current cycle. During this period, as indicated by p on axis b, the voltage EG—61 is merely the voltage drop of the tube. Although current flows in the circuit of grid 61 and thus through the coil 46 during this time, the value of the current is insufficient and lasts for too short a time to actuate the relay 19. Thereafter the A. C. voltage of the left half of winding 46 is superposed on the D. C. bias f, and the grid voltage EG—61 varies, as indicated, below axis b during the period O—Q. Throughout this period the voltage of grid 61 is either zero or slightly positive at the beginning of the positive portions of EA—37. This causes anode 37 or tube 22 to start conducting current at the beginning of each positive half cycle, and thus the voltage of anode 37 above the b axis during the period O—Q is the voltage drop of the tube. Due to this fact, substantially the entire top half of the normal sine wave portion of voltage EA—37 is cut off during this period. During the period O—Q, the voltage EG—62 (c axis) is substantially the voltage EA—37 (axis b), since the grid 62 is connected to the anode 37 through the resistance 79 and condenser 87. The voltage EG—62 on the grid 62 is either zero or slightly positive whenever the voltage EA—38 becomes positive. Thus the anode 38 or the tube 23 starts conducting current at the beginning of each positive half cycle, as indicated by the flat portions of the voltage curve EA—38 slightly above the b axis. In exactly the same way EG—59, which corresponds to EA—38, causes the tube 20 to conduct current throughout the period O—Q, as indicated by the shape of voltage EA—35.

In tube 24 a negative D. C. bias voltage g is impressed on the grid 63 from the potentiometer 70. This bias is indicated below the axis e, and is somewhat more than the peak value of the A. C. voltage applied to the anode 38, and thus to the grid 63. During the period O—Q, the voltage of the anode 38 is superimposed on the bias voltage g on the grid 63, and thus the grid voltage EG—63 follows the curve, as shown below axis e, and always remains negative throughout this period. Thus tube 24 is non-conducting and its anode voltage EA—39 is a full sine wave.

The voltage on the grid 60 of tube 21 during this period corresponds to the voltage on the anode 35 of the tube 20, and therefore follows the dot-dash curve EG—60a of axis a.

It will be noted in each case that the voltages EA—38 to EA—35, inclusive, are 90 degrees apart, and the voltage EA—39 is in phase with the voltage EA—38. Likewise the grid voltage in each of the tubes 20—23 leads the respective anode voltage of its tube by 90 degrees. In the case of tube 24, however, the grid voltage and the anode voltage are in phase.

The point at which the pushbutton 48 is closed may properly be represented by the point Q where the voltage EA—36 starts to become positive. Since at this point the circuit to the anode 36 is closed, said anode can start conducting current provided the grid voltage allows such conduction. At the point Q, the voltage EG—60 is either zero or slightly positive, and thus anode 36 or tube 21 starts to conduct current at this point. This current flows through the coil 46, causing the relay 19 to pick up. Hold-in contacts 89 across the contacts 47 are then closed. This insures that a complete welding cycle is carried out even if pushbutton switch 48 is released before the welding cycle has been completed. The relay 19 also causes the armature 18 to close the contacts 17. This energizes the solenoid 7 which pulls up the valve 6. Thus fluid from 5 is supplied to the gun 4, and the electrodes 1—1 are moved so as to clamp or squeeze the resistance welding load 2.

When the tube 21 starts to conduct current, the top halves of the full sine wave shape of voltage EA—36 are cut off. Therefore the grid voltage EG—61 is not swung to zero or slightly positive at the beginning of each positive half cycle of the anode voltage EA—37. Thus throughout the period Q—R, the bias on the condenser 86 maintains the grid 61 negative when the anode voltage EA—37 is positive, and the tube 22 is non-conducting as shown by the full sine wave shape of curve EA—37 on axis b. However, the D. C. voltage on condenser 86 can discharge through resistance 82, and the voltage EG—61 gradually becomes less negative until at R it becomes zero or slightly positive. Thus when the voltage EA—37 again becomes positive at the point R, the anode 37 or the tube 22 starts to conduct current. The rate of discharge of the condenser 86 is determined by the setting of resistance 82, and thus the length of the period Q—R can be set at any desired value by adjusting the resistance 82.

During the quarter cycle s, indicated on axis c, the grid 62 has the full A. C. voltage corresponding to EA—37 (axis b) impressed on it, and so current flows to the grid 62 acting as an anode with respect to its cathode 28. This flow of current charges the condenser 87 through the resistance 79 to the peak value of the A. C. voltage. This gives to the grid 62 the D. C. bias h, represented below the axis c. The full sine wave voltage corresponding to EA—37 (axis b) is superimposed on this bias voltage h, and the grid voltage EG—62 follows the curve on axis c during the period Q—R, as shown. During this time the grid 62 is at zero potential or slightly positive each time the anode voltage EA—38 becomes positive, and thus the tube 23 continues to conduct current throughout this period. When the tube 22 again starts to conduct current at the point R, as described above, the top halves of the anode voltage EA—37 (axis b) and thus of the grid voltage EG—62 (axis c) are cut off. As in the case of grid 61, the voltage EG—62 therefore is not raised to zero or slightly positive at the beginning of each positive half cycle of EA—38. Thus throughout the period R—T, the charge on condenser 87 maintains the grid 62 negative when the anode voltage EA—38 is positive, and tube 23 is therefore non-conducting during this period as shown by the sine wave shape of the anode voltage EA—38. This sine wave voltage is superimposed on the D. C. bias g (axis e) of the grid 63, and the positive peaks of this sine wave voltage carry the voltage of the grid 63 to a positive value during a positive half cycle of the anode voltage EA—39. The anode 39 or the tube 24 thus starts to conduct current when EG—63 becomes positive, as, for example, at point j. This causes current to flow in the coil 58 which pulls up the relay 16. The armature 15 of relay 16 closes contacts 14, and the welding current control unit 3 thus supplies welding current to the electrodes 1—1, and thus to the resistance welding load 2.

As will be seen from the above description, the time from Q to j is dependent on the rate at which condenser 86 discharges through the resistance 82. Thus by adjusting the resistance 82 the period during which the electrodes 1—1 clamp or squeeze the resistance welding load 2 before welding current is supplied to said load, can be predetermined. The time from Q to j is called the "squeeze period." The inductance of coil 58 of relay 16 causes the current through tube 24 to continue for substantially a full half cycle from the firing point, as shown by the curve EA—39 above the e axis beyond the point j. Thus half cycle pulses of current are supplied from tube 24 to coil 58. In order to prevent such intermittent current pulses from causing the relay 16 to chatter, a condenser 92 is placed across the coil 58. With such a connection, the self-inductance of coil 58 tends to keep current flowing therein in the periods intermediate the current pulses supplied thereto. In this way chattering of the relay 16 is prevented.

During the period R—T, the D. C. voltage on condenser 87 can discharge through the resistance 83 and the voltage EG—62 gradually becomes less negative until at T it becomes zero or slightly positive, and therefore when the voltage EA—38 again becomes positive at the point T, tube 23 starts to conduct current as shown by the fact that the positive portions of the voltage EA—38 after the point T are cut off, and therefore the grid voltage EG—63 is not swung to zero or slightly positive at the beginning of each positive half cycle of the voltage EA—39. Thus the D. C. bias g maintains the grid 63 negative so that the tube 24 does not conduct current after the point n. Due, however, to condenser 92, current may continue to flow in coil 58 for substantially another half cycle until about the point k. When the current stops flowing in coil 58 at the point k, relay 16 is released and the flow of welding current to the resistance welding load 2 is stopped.

From the above it will be seen that the time j—k is dependent upon the rate at which condenser 87 discharges through the resistance 83. Thus by adjusting the resistance 83, the period during which the electrodes 1—1 are supplied with welding current can be predetermined. This time j—k is called the "weld period."

During the quarter cycle u, the circuit of grid 59 has the full A. C. voltage EA—38 impressed upon it, and so current flows to the grid 59 acting as an anode with respect to its cathode during said quarter cycle. This flow of current charges the condenser 84 through the resistance 76 to the peak value of the A. C. voltage. This gives to the grid 59 a negative D. C. bias i represented below the axis d. The full sine wave voltage corresponding to EA—38 (axis c) is superimposed on the bias voltage i. The grid voltage EG—59 follows the curve as shown from R—T. During this time the grid 59 is at zero potential or slightly positive each time the anode voltage EA—35 becomes positive, and thus the tube 20 continues to conduct current throughout this period. Due to the fact that when the tube 23 starts to conduct current at the point T and the top halves of the voltage EA—38 are cut off beyond this point, the grid voltage EG—59 is not swung to zero or slightly positive at the beginning of each positive half of the anode voltage EA—35. Thus throughout the period T—W, the bias on the condenser 84 maintains the grid 59 negative when the anode voltage EA—35 is positive, and the tube 20 is non-conducting during this period, as shown by the full sine wave shape of curve EA—35 on axis d. However, the D. C. voltage on condenser 84 can discharge through resistance 80, and the voltage EG—59 gradually becomes less negative until at W it becomes zero or slightly positive. Thus when the voltage EA—35 again becomes positive at the point W, the anode 35 or the tube 20 starts to conduct current.

During the quarter cycle v, indicated on axis a, the circuit of grid 60 has the full A. C. voltage corresponding to voltage EA—35 (axis d) impressed on it, and so current flows to the grid acting as an anode with respect to its cathode 26. This flow of current charges the condenser 85 through the resistance 77 to the peak value of the A. C. voltage. This gives to the grid 60 the D. C. bias m represented below the axis a. The full sine wave voltage corresponding to EA—35 (axis d) is superimposed on this bias voltage m, and with the grid voltage EG—60 follows the curve on axis a during the period T—W, as shown. During this period the grid 60 is at a zero potential or slightly positive each time the anode voltage EA—36 becomes positive, and thus the tube 21 continues to conduct current throughout this period.

When the tube 20 again starts to conduct current at the point W, as described above, the top halves of the anode voltage EA—35 (axis d) and thus of the grid voltage EG—60 (axis a) are cut off. Thus likewise the voltage EG—60 is not raised to zero or slightly positive at the beginning of each positive half cycle of EA—36 beyond the point W. Thus throughout the period W—Q, the charge on condenser 85 maintains the grid 60 negative when the anode voltage EA—36 is positive, and the tube 21 is therefore non-conducting during this period, as shown by the full sine wave shape of the anode voltage EA—36 from W to Q, particularly between O and Q.

When the tube 21 stops conducting at x, current is no longer supplied to the coil 46. However, the current path through the rectifier 91 keeps current flowing in said coil 46 until some such point as that indicated at l. When the current flow stops in coil 46, relay 19 drops, thus deenergizing relay 6, releasing the pressure fluid, and permitting the electrodes 1—1 to be released from the resistance welding load 2. As will be seen from the above description, the time k—l is dependent on the rate at which condenser 84 discharges through resistance 80. Therefore, by adjusting resistance 80, the period during which the electrodes 1—1 continue to squeeze or hold the load 2 after the welding current stops can be predetermined. This is called the "hold period." During the period W—Q or O—Q, the D. C. voltage on condenser 85 can discharge through the resistance 81, and thus the voltage EG—60 gradually becomes less negative until a. Q it becomes zero or slightly positive. Thus if pushbutton 48 is still depressed when the voltage EA—36 becomes positive at the point Q, the tube 21 again becomes conductive, and thereafter actuates the relay 19 to restart the welding cycle.

It will be noted that the points O and l are coincident as the cycle of operations illustrated in Fig. 2 is repeated. The period O—Q or l—Q is dependent on the rate at which condenser 85 discharges through the resistance 81. Thus by adjusting the resistance 81, the period between the release of the resistance welding load 2 by the electrode 1—1 and the subsequent operation of those electrodes to again engage and squeeze the resistance welding load can be predetermined. This is called the "off period."

From the foregoing it will be seen that as long as the pushbutton 48 is maintained in the closed position, the welding cycle described above is repeated. If, however, the pushbutton 48 is opened before the welding cycle is completed, the cycle of operations continues until it is completed, whereupon the operation stops until a subsequent depression of the pushbutton 48.

Mechanical relays, such as 6, 16 and 19, pick up and release later than the actual starting and stopping of current in their actuating coils. Therefore, in an actual welding circuit, the respective periods do not start and stop exactly at the points as indicated in Fig. 2. However, the delay in operation of the relays merely introduces a shift in time of the operation, and therefore the time relationships of the various periods as described in connection with Fig. 2 are substantially those which exist in an actual operating system.

In systems of this kind it is desirable that the length of each period of the welding cycle shall be under completely independent control. Thus an adjustment of each of the control resistances 88 to 93, inclusive, should vary that period of the welding cycle dependent upon the respective control resistance without in any way affecting the length of any other period. The phase displacement between the anode and grid voltages which exist in the above arrangement enables such a complete independence to be obtained. If all of the grid voltages were in phase with all of their respective anode voltages, as each grid voltage came up from a negative value, the associated tube might fire later than 90 degrees on the respective anode voltage wave. However, if the tube started to conduct at a point beyond 90 degrees, it would be too late to extinguish the next tube because said next tube would already have been fired by the peak of the A. C. voltage super-imposed on the D. C. bias imposed on the grid of said next tube by the charge on its associated condenser. Thus as the control resistance of one tube was adjusted so as to delay the rate at which the associated condenser discharges, and as the firing point of the associated tube exceeded a 90-degree delay on the anode voltage, a change of one cycle in the duration of the succeeding period of the welding cycle would occur. Thus during the adjustment of one period of the welding cycle at a certain point the timing or duration of the succeeding welding cycle would be affected. By producing the 90-degree phase shift of the grid voltages with respect to the anode voltages, none of the tubes can fire at a point later than 90 degrees on the positive half of the associated anode voltage. Therefore, the type of operation described above cannot occur and complete independence of control of each period of the welding cycle results.

A welding process as described above involves inherently an intermittent operation of the welding current control device 3. Therefore, the rating of such a device will be based upon such an intermittent operation rather than upon a continuous operation. It is desirable in many instances to limit the percentage time during which the welding current control 3 supplies current to the welding load. If this percentage time exceeds a predetermined value, the rating of the welding current control 3 may be exceeded. Such a percentage time may vary with the magnitude of the welding current. It is also desirable to protect the system against continuous supply of current to the resistance welding load 2. For example, if tube 23 were to become defective so as to be permanently extinguished, in absence of any protective means tube 24 would continue to conduct current indefinitely, and thus maintain the welding current control 3 energized. This would continue to supply current to the resistance welding load 2 without carrying the welding cycle further. The system described in Fig. 1 eliminates the above undesirable operations, and accomplishes both the limitation of the percentage time of operation of the welding current control 3 as well as protection against continuous operation thereof.

As will be seen from the detailed description herein, condenser 88 does not operate exactly as do the other condensers 84 to 87, inclusive. The value of resistance 74 is sufficiently high to impart a relatively large time constant to the circuit which includes the condenser 88 and the resistance 74. Thus in said circuit the axis of the pulsating of A. C. voltage superimposed on the negative D. C. bias $g$ of the potentiometer 70 tends to shift slowly so as to coincide with said D. C. bias. This condition of coincidence exists during substantially the entire welding cycle, with the exception of the "welding period." However, during said welding period, the axis of the A. C. component of EG—63 shifts downwardly slowly, due to the relatively large time constant of the circuit including the resistance 74 and condenser 88. The rate at which the axis of said A. C. component drops to the D. C. bias $g$ depends upon said time constant of said circuit. As this change occurs, the peak of the grid voltage wave EG—63 occurs later. Consequently the firing point on the voltage EA—39 is delayed until the anode 39 fires at 90 degrees on the positive half of said voltage wave EA—39. Firing beyond this point is prevented because as the grid voltage EG—63 drops further, the peaks of said grid voltage no longer become positive, and tube 24 is no longer conductive. If tube 23 were to be extinguished for a sufficiently long time, the voltage of grid 63 would finally drop to the position indicated at EG—63$a$, and therefore tube 24 would be extinguished. Thus if the resistance 83 is set so as to tend to cause the supply of welding current to continue for a period greater than a predetermined value, tube 24 would refuse to supply welding current for a period of time greater than said predetermined value. By adjusting the bias voltage $g$ by means of the adjustable tap 72, this maximum value of the weld period can be set at any predetermined figure. Some adjustment could also be made by varying the value of resistance 74, whereby the time constant of the circuits 74—88 could be changed. If due to some influence, tube 23 were to be extinguished for an indefinite period, tube 24 would only permit welding current to be supplied for one maximum period, and then said tube 24 would be extinguished, stopping further operation of the system. It is desirable, therefore, that at the lowest value of the grid bias $g$ given by the tap 72, said bias is slightly greater than the peak value of the A. C. voltage EA—37 in order to give this protection against failure of tube 23.

In the specification and claims, stopping of conduction of a tube means non-conduction when a positive potential is impressed on the anode of said tube.

Of course it is to be understood that this invention is not limited to the particular details described above as many equivalents will suggest themselves to those skilled in the art. For example, the timing arrangement could be applied to systems other than welding systems. The invention is capable of providing any desired number of independently timed consecutive periods by providing a similar number of tubes such as tubes 20 to 23, inclusive, together with their associated timing elements. Likewise various different types of tubes and circuit arrangements could be devised to incorporate the principles as set forth in the above embodiment. It is accordingly desired that the appended claims be given a broad interpretation commensurate with the scope of the invention within the art.

What is claimed is:

1. In combination, a plurality of rectifying electrical space discharge devices of the type in which conduction between two electrodes is initiated by a control electrode, means for impressing alternating voltages between said two electrodes of each of said discharge devices, means responsive to the stoppage of conduction in one of said discharge devices for supplying a bias voltage between the control electrode and one of said two electrodes of another of said discharge devices, and means responsive to the restarting of conduction in the first-named discharge device for rendering said bias voltage effective to stop conduction in the second-named discharge device.

2. In combination, a plurality of rectifying electrical space discharge devices of the type in which conduction between two electrodes is initiated by a control electrode, means for impressing alternating voltages between said two electrodes of each of said discharge devices, means responsive to the stoppage of conduction in one of said discharge devices for supplying a bias voltage between the control electrode and one of said two electrodes of another of said discharge devices, means responsive to the restarting of conduction in the first-named discharge device for rendering said bias voltage effective to stop conduction in the second-named discharge device, and means having a predetermined time constant for reducing said bias voltage, upon stoppage of conduction in said second-named discharge device, to allow said second-named discharge device to restart after a predetermined length of time.

3. In combination, a group of rectifying electrical space discharge devices of the type in which conduction between two electrodes is initiated by a control electrode, means for impressing alternating voltages between said two electrodes of each of said discharge devices, means responsive to the stoppage of conduction in each of said discharge devices for supplying a bias voltage between the control electrode and one of said two electrodes of a succeeding one of said discharge devices, means responsive to the restarting of conduction in the first-named discharge device for rendering said bias voltage effective to stop conduction in the second-named discharge device, means having a predetermined time constant for reducing said bias voltage, upon stoppage of conduction in said second-named discharge device, to allow said second-named discharge device to restart after a predetermined length of time, and similar means associating the end discharge device of said group with the initial discharge device of said group for stopping conduction of said initial discharge device upon stopping and restarting of said end discharge device and for restarting said initial discharge device after a predetermined length of time.

4. In combination, a plurality of rectifying electrical space discharge devices of the type having a cathode and an anode between which conduction is initiated by a control electrode, the cathodes of said discharge devices being connected together, means for impressing alternating voltages between the anode and cathode of each of said discharge devices, the control electrode of one discharge device being connected to the anode of another of said discharge devices through a condenser, whereby upon stoppage of conduction in said second-named discharge device, conduction between the cathode and control electrode of said first-named discharge device charges said condenser to a bias voltage and upon restarting of conduction in said second-named discharge device said bias voltage becomes effective to stop conduction in said first-named discharge device.

5. In combination, a plurality of rectifying electrical space discharge devices of the type having a cathode and an anode between which conduction is initiated by a control electrode, the cathodes of said discharge devices being connected together, means for impressing alternating voltages between the anode and cathode of each of said discharge devices, the control electrode of one discharge device being connected to the anode of another of said discharge devices through a condenser, whereby upon stoppage of conduction in said second-named discharge device conduction between the cathode and control electrode of said first-named discharge device charges said condenser to a bias voltage, and a discharge path for said condenser having a predetermined time constant for reducing said bias voltage, upon stoppage of conduction in said first-named discharge devices, to allow said first-named discharge device to restart after a predetermined length of time.

6. In combination, a plurality of rectifying electrical space discharge devices of the type having a cathode and an anode between which conduction is initiated by a control electrode, the cathodes of said discharge devices being connected together, means for impressing alternating voltages between the anode and cathode of each of said discharge devices, the control electrode of one discharge device being connected to the anode of another of said discharge devices through a condenser, whereby upon stoppage of conduction in said second-named discharge device conduction between the cathode and control electrode of said first-named discharge device charges said condenser to a bias voltage, and a discharge path for said condenser having a predetermined time constant for reducing said bias voltage, upon stoppage of conduction in said first-named discharge devices, to allow said first-named discharge device to restart after a predetermined length of time, said discharge path having an adjustable resistance for adjusting said time constant.

7. In combination, a plurality of rectifying electrical space discharge devices of the type having a cathode and an anode between which conduction is initiated by a control electrode, the cathodes of said discharge devices being connected together, means for impressing alternating voltages between the anode and cathode of each of said discharge devices, the control electrodes of one discharge device being connected to the anode of another of said discharge devices through a relatively low impedance path, said anode voltages being angularly displaced with respect to each other.

8. In combination, a plurality of rectifying electrical space discharge devices of the type having a cathode and an anode between which conduction is initiated by a control electrode, the cathodes of said discharge devices being connected together, means for impressing alternating voltages between the anode and cathode of each of said discharge devices, the control electrode of one discharge device being connected to the anode of another of said discharge devices through a relatively low impedance path, said alternating voltages being angularly displaced with respect to each other by a phase angle of the order of magnitude of ninety degrees.

9. In combination, a rectifying electrical space discharge device of the type having a cathode and an anode between which conduction is initiated by a control electrode, means for impressing an alternating voltage between the cathode and anode of said discharge device, means for impressing a bias voltage between said control electrode and one of said other electrodes for preventing initiation of conduction in said discharge device, means operating for a predetermined time for superimposing an alternating voltage on said bias voltage with peak values sufficient to overcome said bias voltage and to permit initiation of conduction in said discharge device, and means for increasing said bias voltage at a predetermined rate, whereby said peak values are insufficient to cause conduction of said discharge device if said conduction exceeds another predetermined maximum time.

10. In combination, a rectifying electrical space discharge device of the type having a cathode and an anode between which conduction is initiated by a control electrode, means for impressing an alternating voltage between the anode and cathode of said discharge device, a control circuit for said control electrode having a relatively large time constant, means for impressing a bias voltage between said control electrode and one of said other electrodes through said control circuit for preventing initiation of conduction in said discharge device, means for superimposing an alternating voltage through said control circuit on said bias voltage with peak values sufficient to overcome said bias voltage and to permit initiation of conduction in said discharge device, and means for increasing said bias voltage at a predetermined rate until said peak values are insufficient to cause conduction of said discharge device if said conduction exceeds a predetermined maximum time.

11. In combination, a rectifying electrical space discharge device of the type having a cathode and an anode between which conduction is initiated by a control electrode, means for impressing an alternating voltage between the cathode and anode of said discharge device, a control circuit for said control electrode comprising a serially-connected condenser and resistance and having a relatively large time constant, means for impressing a bias voltage between said control electrode and one of said other electrodes through said control circuit for preventing initiation of conduction in said discharge device, means for superimposing an alternating voltage through said control circuit on said bias voltage with peak values sufficient to overcome said bias voltage and to permit initiation of conduction in said discharge device, and means for increasing said bias voltage at a predetermined rate until said peak values are insufficient to cause conduction of said discharge device if said conduction exceeds a predetermined maximum time.

12. In combination, a rectifying electrical space discharge device of the type having a cathode and an anode between which conduction is initiated by a control electrode, means for impressing an alternating voltage between the cathode and anode of said discharge device, a control circuit for said control electrode having a relatively large time constant, means for impressing a bias voltage between said control electrode and one of said other electrodes through said control circuit for preventing initiation of conduction in said discharge device, means for superimposing an alternating voltage through said control circuit on said bias voltage with peak values sufficient to overcome said bias voltage and to permit initiation of conduction in said discharge device, and means for increasing said bias voltage at a predetermined rate until said peak values are insufficient to cause conduction of said discharge device if said conduction exceeds a predetermined maximum time, said bias voltage being adjustable to vary said maximum time of operation of said discharge device.

13. In combination, two operating means adapted to operate in predetermined sequence upon a common device, actuating means for causing operation of one of said operating means, actuating means for causing operation of the other of said operating means, electrical space discharge timing means for causing energization of said second actuating means at a predetermined time after energization of said first actuating means, electrical space discharge timing means for causing said second actuating means to be deenergized at a predetermined time after its energization, electrical space discharge timing means for causing said first actuating means to be deenergized at a predetermined time after deenergization of said second actuating means, and electrical space discharge timing means for causing energization of said first actuating means at a predetermined time after its deenergization.

14. In combination, two operating means adapted to operate in predetermined sequence upon a common device, actuating means for causing operation of one of said operating means, actuating means for causing operation of the other of said operating means, electrical space discharge timing means for causing energization of said second actuating means at a predetermined time after energization of said first actuating means, electrical space discharge timing means for causing said second actuating means to be deenergized at a predetermined time after its energization, electrical space discharge timing means for causing said first actuating means to be deenergized at a predetermined time after deenergization of said second actuating means, and electrical space discharge timing means for causing energization of said first actuating means at a predetermined time after its deenergization, the timing period of each of said timing means being independent of the operation of said actuating means.

15. In combination, two operating means adapted to operate in predetermined sequence upon a common device, actuating means for causing operation of one of said operating means, actuating means for causing operation of the other of said operating means, electrical space discharge timing means for causing energization of said second actuating means at a predetermined time after energization of said first actuating means, electrical space discharge timing means for causing said second actuating means to be deenergized at a predetermined time after its energization, electrical space discharge timing means for causing said first actuating means to be deenergized at a predetermined time after deenergization of said second actuating means, and electrical space discharge timing means for causing energization of said first actuating means at a predetermined time after its deenergization, the timing period of each of said timing means being independently adjustable and unaffected by the adjustment of any of the other timing means.

16. In combination, a plurality of rectifying electrical space discharge devices of the type having a cathode and an anode between which conduction is initiated by a control electrode, the cathodes of said discharge devices being connected together, means for impressing alternating voltages between the anode and cathode of each of said devices, the control electrode of one discharge device being connected to the anode of another of said discharge devices through a condenser.

17. In combination, a plurality of rectifying space discharge devices of the type having a cathode and an anode between which conduction is initiated by a control electrode, the cathodes of said discharge devices being connected together, means for impressing alternating voltages between the anode and cathode of each of said devices, the control electrode of one discharge device being connected to the anode of another of said discharge devices through a relatively low impedance path.

WILCOX P. OVERBECK.

CERTIFICATE OF CORRECTION.

Patent No. 2,295,601. September 15, 1942.

WILCOX P. OVERBECK.

It is hereby certified that error appears in the printed specification of the above numbered patent requiring correction as follows: Page 2, second column, line 73, for "gride" read --grid--; page 5, first column, line 24, for "88 to 83" read --80 to 83--; page 6, second column, line 69-70, claim 7, for "electrodes" read --electrode--; line 73, same claim, for "anode" read --alternating--; and that the said Letters Patent should be read with this correction therein that the same may conform to the record of the case in the Patent Office.

Signed and sealed this 3rd day of November, A. D. 1942.

(Seal)

Henry Van Arsdale,
Acting Commissioner of Patents.